United States Patent
Ryan et al.

(10) Patent No.: US 8,135,002 B2
(45) Date of Patent: Mar. 13, 2012

(54) METHOD AND APPARATUS FOR HORIZONTALLY SLICING A MULTI-STAGE SWITCH FABRIC

(75) Inventors: Thomas E. Ryan, Boylston, MA (US);
Mark E. Boduch, Geneva, IL (US);
John B. Kenney, Granger, IN (US)

(73) Assignee: Tellabs Operations, Inc., Naperville, IL (US)

( * ) Notice: Subject to any disclaimer, the term of this patent is extended or adjusted under 35 U.S.C. 154(b) by 0 days.

(21) Appl. No.: 12/688,720

(22) Filed: Jan. 15, 2010

(65) Prior Publication Data
US 2010/0183003 A1    Jul. 22, 2010

Related U.S. Application Data

(63) Continuation of application No. 11/013,020, filed on Dec. 15, 2004, now Pat. No. 7,675,909.

(51) Int. Cl.
*H04L 12/50* (2006.01)
*H04L 12/56* (2006.01)
*H04Q 11/00* (2006.01)

(52) U.S. Cl. .................. 370/360; 370/388; 370/389

(58) Field of Classification Search ............... None
See application file for complete search history.

(56) References Cited

U.S. PATENT DOCUMENTS

| | | | |
|---|---|---|---|
| 4,360,911 A * | 11/1982 | Hardy | 370/368 |
| 6,393,019 B1 * | 5/2002 | Dobashi et al. | 370/352 |
| 2005/0068946 A1 * | 3/2005 | Beshai | 370/368 |

* cited by examiner

*Primary Examiner* — Melanie Jagannathan
(74) *Attorney, Agent, or Firm* — Dean D. Small; The Small Patent Law Group, LLC

(57) ABSTRACT

A method and apparatus are provided for horizontally slicing a multi-stage switching fabric having transmission inputs and transmission outputs to and from the switch fabric. The switching fabric includes switch elements arranged in at least first and second stages, each switch element having element inputs and outputs with each switch element being configured to join one of the element inputs with an associated one of the element outputs. The switch fabric includes a first logic device that contains a stage-1 subset of the switch elements that is arranged within, and configured to operate as part of, the first stage. The first logic device also contains a stage-2 subset of the switch elements arranged within, and configured to operate as part of, the second stage. The switch fabric includes a second logic device that contains a stage-1 subset of the switch elements that is arranged within, and configured to operate as part of, the first stage. The second logic device also contains a stage-2 subset of the switch elements that is arranged within, and configured to operate as part of, the second stage. The first and second logic devices are physically discrete from one another.

20 Claims, 11 Drawing Sheets

METHOD AND APPARATUS FOR HORIZONTALLY SLICING A MULTI-STAGE SWITCH FABRIC

CROSS REFERENCE TO RELATED APPLICATIONS

This application claims priority to and is a continuation of U.S. application Ser. No. 11/013,020, filed Dec. 15, 2004, titled "METHOD AND APPARATUS FOR HORIZONTALLY SLICING A MULTI-STAGE SWITCH FABRIC", the subject matter of which is herein incorporated by reference in their entirety.

BACKGROUND OF THE INVENTION

The invention relates generally to switching networks, and more particularly, to multi-stage switching networks.

Numerous designs exist for switching fabrics or networks. A switching fabric provides for the set up and release of connections between transmission channels in a dynamic manner or on an "as-needed basis". A switching fabric may be designed as an array of crosspoints, each crosspoint providing a connection from a transmission input directly to a transmission output through the associated crosspoint. The switching crosspoints are organized in stages. The switch fabric may include one or more stages. A one-to-one correspondence exists between an input and output pair, and a switching crosspoint, for a single stage switching fabric. Alternatively, an input may be connected to an output through multiple crosspoints or switching stages. A stage of a multi-stage switching fabric provides connectivity between an input group of transmission inputs and an output group of transmission outputs. The input group or output group or both may represent connections internal to the switching fabric, and thus interconnect the stages of the switching fabric in contrast to transmission inputs and outputs of the overall switching fabric. Switching fabrics having multiple stages have been discussed in *Digital Telephony* by John C. Bellamy, John Wiley & Sons, Inc.; 3$^{rd}$ Ed Edition (Jul. 7, 2000).

The logic layout or schematic for a multi-stage switching fabric may be segmented into sections of circuitry. Each section may then be packaged into an integrated circuit (IC) logic device. E.g. Examples of logic devices include a application specific integrated circuits (ASICs), field programmable gate arrays (FPGAs), gate arrays, application specific standard products (ASSPs), and any other similar logic devices. Typically, the logic of the switching fabric is organized and viewed as a vertical structure of columns (vertical slices), each column comprised of a plurality of switch elements. Each column represents a stage of the multi-stage switching fabric. A switching element may be viewed as a combination of multiplexers configured to allow any one of a group of transmission inputs to connect to any one of a group of transmission outputs. Typically, a set of switch elements of a column or stage are grouped for implementation into an IC or ASIC. A column or functional stage is typically implemented as one or more ASICs. The ASICs of each stage are interconnected to the ASICs of other stages to perform the logic functions of the switching fabric.

An alternative to interconnecting a group of ASICs to perform the logic functions of a switching fabric is to build one large chip or ASIC. However, as the amount of circuitry in a single ASIC increases, the cost of the ASIC also increases. The cost-to-ASIC-size relationship is generally linear until a certain ASIC size is reached, whereupon increasing the size of the ASIC dramatically increases the cost in a non-linear fashion. Thus, the packaging of the switching logic of a switch fabric into one single chip is limited by the cost of producing such a chip.

However, segmenting the switching fabric into vertical columns whereby each column is associated with a switching stage, and implementing each column or stage as a set of ASICs, also has drawbacks and inefficiencies. There may be a significant amount of switching logic in each chip or ASIC, and the ASIC logic may not be fully utilized in each stage of the multi-stage fabric. The total logic implemented in the ASICs for a switching fabric may be under utilized. Furthermore, the number of interconnections between the ASICs may be numerous and increase in complexity as the fabric size increases.

A need exists for further reduction in logic device size and logic device interconnections for implementing multi-stage switching fabrics.

BRIEF DESCRIPTION OF THE INVENTION

In an exemplary embodiment, a multi-stage switching fabric having transmission inputs and transmission outputs to and from the switch fabric is provided. The switching fabric includes switch elements arranged in at least first and second stages, each switch element having element inputs and outputs with each switch element being configured to join one of the element inputs with an associated one of the element outputs. The switch fabric includes a first logic device that contains a stage-1 subset of the switch elements that is arranged within, and configured to operate as part of, the first stage. The first logic device also contains a stage-2 subset of the switch elements arranged within, and configured to operate as part of, the second stage. The switch fabric includes a second logic device that contains a stage-1 subset of the switch elements that is arranged within, and configured to operate as part of, the first stage. The second logic device also contains a stage-2 subset of the switch elements that is arranged within, and configured to operate as part of, the second stage. The first and second logic devices are physically discrete from one another.

In another exemplary embodiment, a multi-stage switching fabric is provided with a first logic device and a second logic device that are physically separate from one another as stage-1, stage-2 and stage-3 switch elements. The first and second logic devices have switch elements arranged in three stages. The switching fabric includes a routing path between the stage-1 input and the stage-3 output of the first logic device through the three stages. The routing path extends from a stage-1 switch element to a stage-2 element and then a stage-3 element. The routing path may be embedded entirely within the first logic device or alternatively be partially or wholly external to the first and second logic devices.

In yet another exemplary embodiment, a method is provided for partitioning a multi-stage switching fabric. The method includes arranging switch elements in stages of the multi-stage switching fabric and slicing the switching fabric into logic units such that at least a first logic unit includes switch elements from multiple stages. The switch elements associated with each logic unit are grouped into corresponding logic devices. The logic devices are interconnected based on a routing pattern to form the multi-stage switching fabric.

In a further embodiment, a logic device is provided that is configured to be used in a switching fabric. The logic device includes device inputs and device outputs configured to receive and produce external signals, respectively. Switch elements within the logic device are arranged in at least one stage of a switching fabric. The switch elements have stage inputs and stage outputs. The logic device also includes multiplexer logic that is provided between at least one of the device and stage inputs and the device and stage outputs to multiplex connections there between.

DETAILED DESCRIPTION OF THE INVENTION

Figure 1:
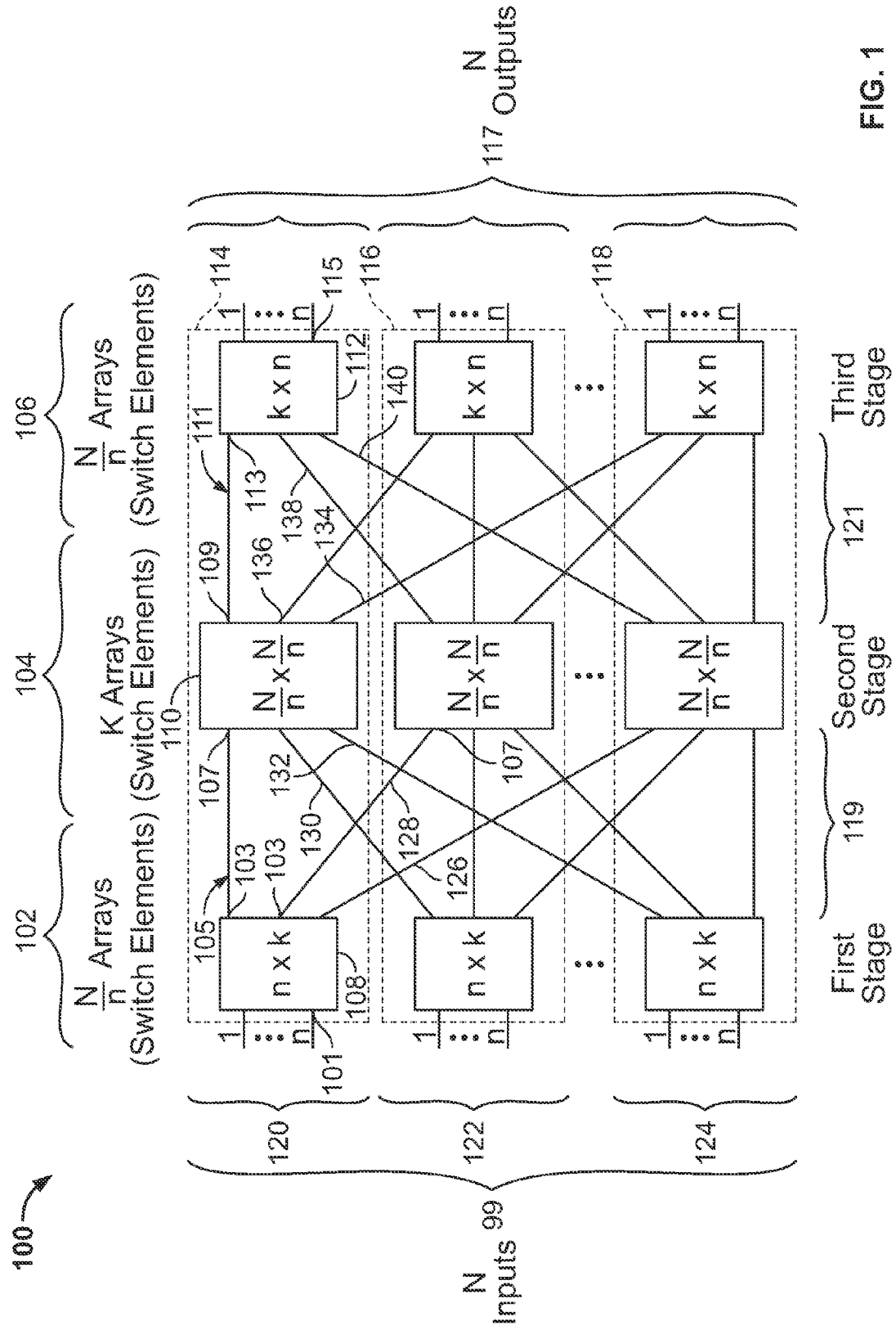
FIG. 1 illustrates a general block diagram of a three-stage switching fabric.

FIG. 1 is a general block diagram of a three-stage switch fabric or switching fabric 100. The switching fabric 100 is a square switching fabric with N device or fabric inputs 99 and N fabric outputs 117. The switching fabric 100 is divided into functional columns, each of which is associated with a functional stage. A first column is associated with a first stage 102, a second column is associated with a second stage 104, and a third column is associated with a third stage 106. Optionally, fewer or more stages may be included. The first stage 102 comprises a plurality of stage-1 switch elements 108, the second stage 104 comprises a plurality of stage-2 switch elements 110, and the third stage 106 comprises a plurality of stage-3 switch elements 112. A switch element allows any one of several inputs to connect to any one of several outputs. For example, the switch element 108 allows any one of the stage-1 inputs 101 to connect to any one of the stage-1 outputs 103. As taught by Bellamy, each switch element may further be of the "time division switching" type switch element. A fabric constructed from "time division switching" type switch elements provides for multiple sub-connections along any given physical connection path through the fabric. The switch fabric 100 is partitioned horizontally into logic units 114, 116 and 118, each of which may be implemented on a separate corresponding logic device.

The outputs 103 of the stage-1 switch element 108 are connected to the inputs 107 of the stage-2 switch elements 110 through inter-stage connections 105. The inter-stage connections 105 may be referred to as juncture connections or junctures. One or more inter-stage connections may be combined to form a routing path. The inter-stage connections 105 and 111 are arranged in a predetermined configuration, such as in a traditional CLOS interconnect configuration. A configuration of inter-stage connections represents a routing pattern. The term "routing pattern" shall be used to refer to a particular group of inter-stage connections, whether for a complete switching fabric or for a portion of a switching fabric. For example, the group of inter-stage connections between the first and second stages 102 and 104, may be considered a stage-1 to stage-2 routing pattern 119, while the group of inter-stages connections between the second and third stages 104 and 106 may be considered a stage-2 to stage-3 routing pattern 121. A first portion of the stage-1 to stage-2 routing pattern 119 is within the logic unit 114, while second and third portions of the stage-1 to stage-2 routing pattern 119 are within logic units 116 and 118, respectively.

Each switch element 108 of first stage 102 has a matrix size n-by-k whereby any one of the n stage-1 inputs 101 may be connected to any one of the k stage-1 outputs 103. In the example of FIG. 1, the total number of switch elements 108 is N/n where each switch element 108 has n inputs 101 and there are a total of N inputs 99 served by the first stage 102. Each switch element 110 of the second stage 104 has a matrix size of N/n by N/n. The N/n stage-2 outputs 109 from the switch element 110 are joined through inter-stage connections 111 to the stage-3 inputs 113 of the switch elements 112 of the third stage 106. The number of switch elements 110 in the second stage 104 may be chosen arbitrarily to be k, whereby $k \geq n$. Choosing k to be at least 2n −1 provides for strict non-blocking of inputs to outputs for the switching fabric 100. A strict non-blocking switching fabric is one in which a path through the switch fabric can always be found for an idle switch input and an idle switch output. The ratio k/n is referred to as the switch expansion factor, and is usually chosen $\geq 1$.

The matrix size of each switch element 112 is k by n. Each switch element 112 in the third stage 106 has k stage-3 inputs 113 and n outputs 115. There are a total of N outputs 117 from the switching fabric 100 and there are N/n switch elements 112.

Figure 2:
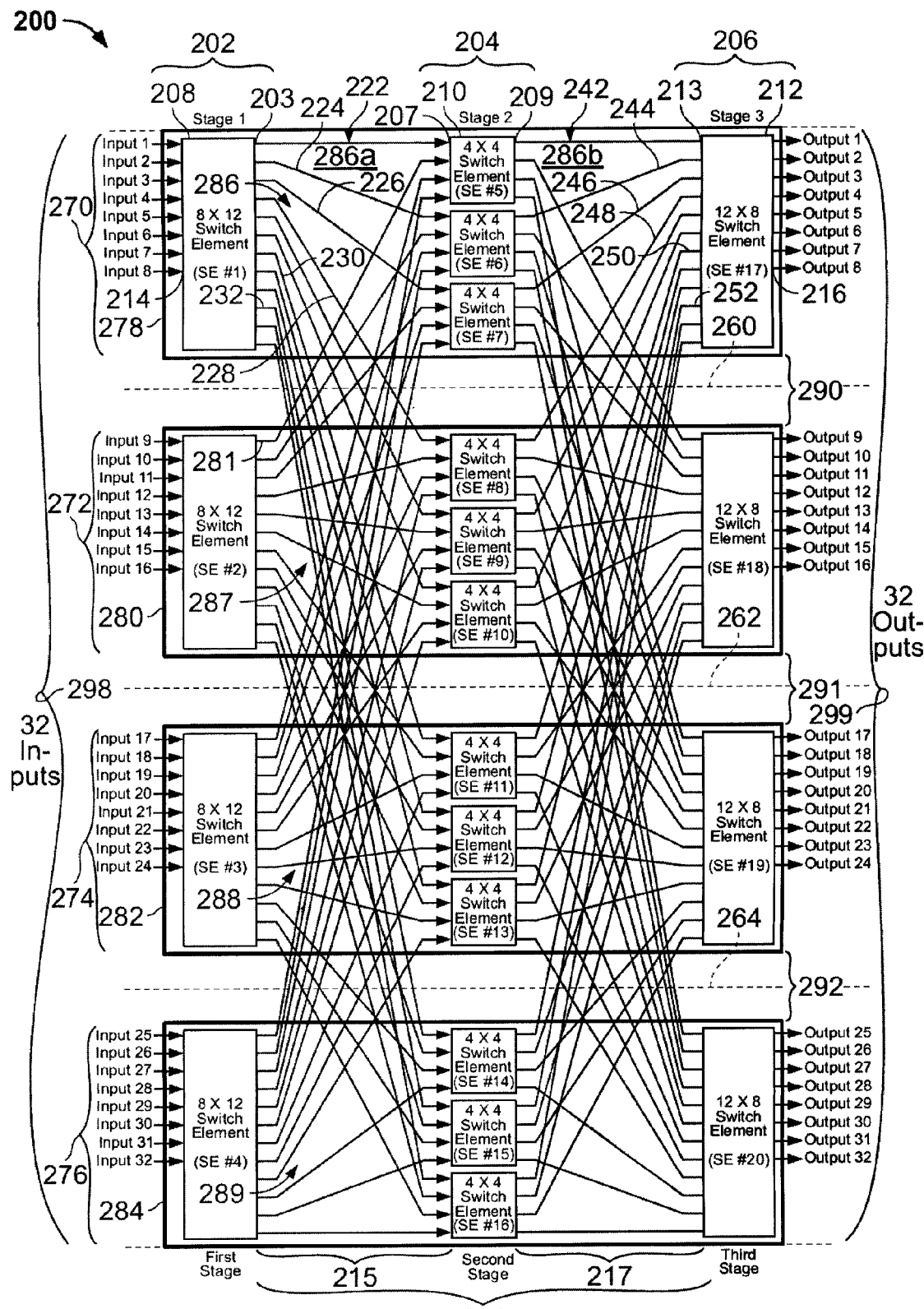
FIG. 2 illustrates a detailed block diagram of a three-stage 32-by-32 switching fabric.

FIG. 2 is a detailed block diagram of a three-stage 32-by-32 space switch fabric 200 with an exemplary routing pattern 201 interconnecting device or fabric inputs 298 and outputs 299. The routing pattern 201 of the switch fabric 200 includes a stage-1 to stage-2 routing pattern 215 and a stage-2 to stage-3 routing pattern 217. The switch fabric 200 is a square switching fabric with 32 inputs 298 and 32 outputs 299. The switch fabric 200 is divided into three columns, each of which is associated with a stage. A first column is associated with a first stage 202, a second column is associated with a second stage 204, and a third column is associated with a third stage 206. The first stage 202 comprises a plurality of stage-1 switch elements 208, the second stage 204 comprises a plurality of stage-2 switch elements 210, and the third stage 206 comprises a plurality of stage-3 switch elements 212.

Each switch element 208 of first stage 202 has a matrix size of n-by-k=8-by-12 whereby any one of the 8 stage-1 inputs 214 may be connected to any one of the 12 stage-1 outputs 203 of the switch element 208. The total number of stage-1 switch elements 208 is N/n=32/8=4 and are designated SE#1 to SE#4.

Each switch element 210 of the second stage 204 has a matrix size of N/n-by-N/n=4-by-4. Inter-stage connections 222 join the outputs 203 of the stage-1 switch elements 208 with the inputs 207 of the stage-2 switch elements 210. Likewise, there are N/n=32/8=4 stage-2 outputs 209 from each stage-2 switch element 210. The number of switch elements 210 in the second stage 204 may be chosen arbitrarily to be k=12 and are designated SE#5 to SE#16 . In this example the switch expansion factor k/n=12/8=1.5.

Each switch element 212 of the third stage 206 has 12 stage-3 inputs 213 and 8 stage-3 outputs 216. The matrix size of each switch element 212 is k-by-n=12-by-8. The switch elements 212 are designated SE#17 to SE#20. The stage-3 inputs 213 are joined to the stage-2 outputs 209 by inter-stage connections 242. In the example of FIG. 2, there are four stage-3 switch elements 212. Each switch element 212 has 12 stage-3 inputs 213 that are joined by inter-stage connections 242 with each of the 12 switch elements 210 of the second stage 204.

In operations, the input 214 may be routed to the output 216 via stage-1 switch element SE#1, inter-stage connection 224, stage-2 switch element SE#6, inter-stage connection 244, and stage-3 switch element SE#17. The inter-stage connections 224 and 244 combine to form a routing path. Alternatively, the input 214 may be routed to the output 216 via SE#7 and inter-stage connections 226 and 246, or via SE#8 and inter-stage connections 228 and 248, or via SE#11 and inter-stage connections 230 and 250, or via SE#14 and inter-stage connections 232 and 252 and the like. In each example above, a different stage-2 switch element 210 is used in the path from the input 214 to the output 216. Any one of the stage-2 switch elements 210 may be used to connect the input 214 to the output 216, and thus there are k=12 paths possible.

Figure 3:
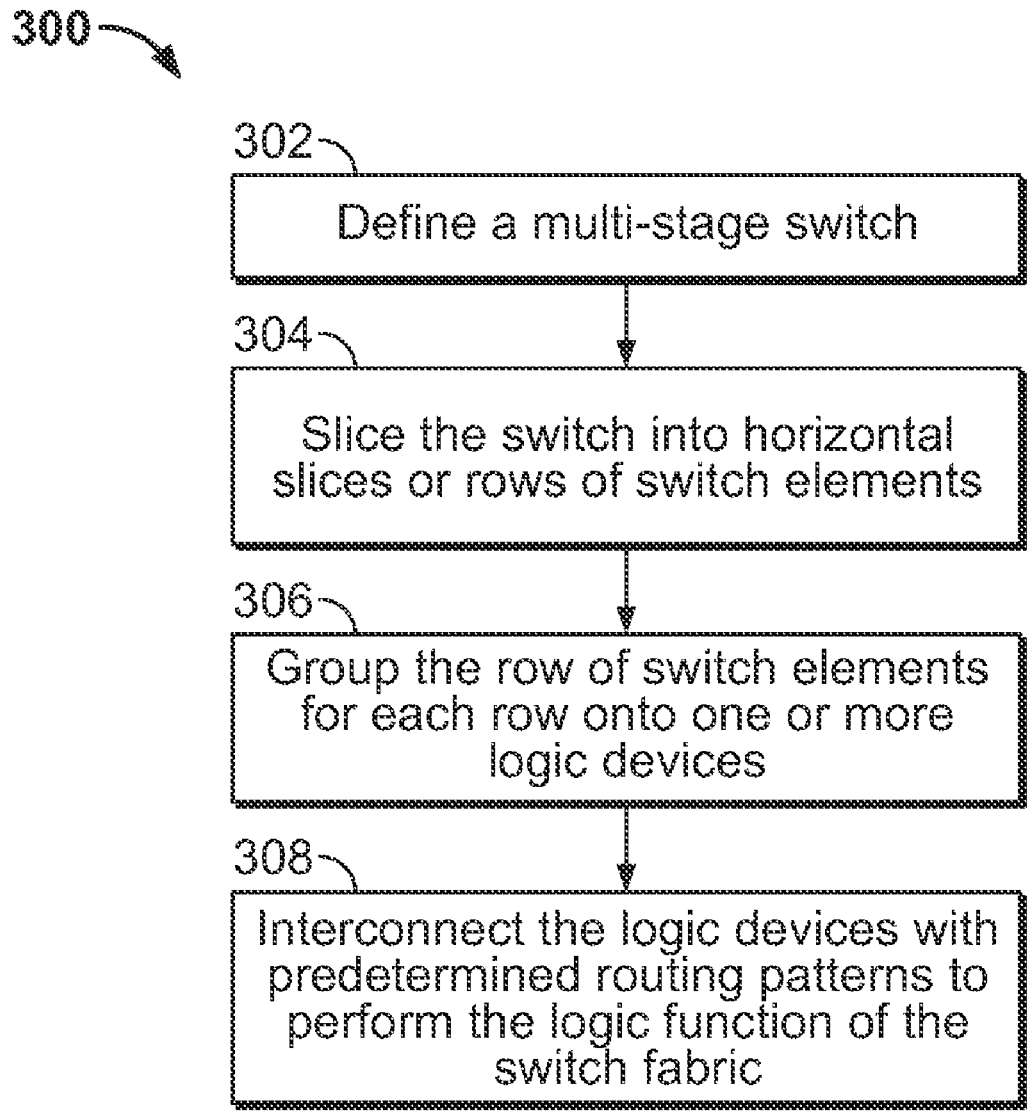
FIG. 3 illustrates a flowchart describing an exemplary process for partitioning a switching fabric into discrete logical devices.

FIG. 3 is a flowchart 300 describing an exemplary process for slicing or partitioning a switching fabric into logic units. Each logic unit is then implemented on a single discrete logic device which represents a single integrated component. For example, the discrete logic device may be a single ASIC, FPGA, gate array, ASSP and or the like. For example, a switch fabric partitioned into three logic units may be implemented on three ASICs. Referring to FIG. 3, at 302, a multi-stage switching fabric is defined by arranging the switch elements of the switching fabric into individual stages. For example, to define the switching fabric 100, several characteristics may be chosen, such as the number of transmission inputs 99 and outputs 117, the number of stages 102, 104, 106, the number of switch elements 108, 110, 112 per stage, the matrix size (n×k; N/n×N/n; k×n) in each switch element, the routing pattern and/or the like.

At 304, the multi-stage switching fabric 100 is sliced into horizontal logic units 114, 116 and 118 denoted by rows 120, 122, and 124 (FIG. 1). Each logic unit 114, 116 and 118 comprises one or more switch elements 108, 110, and 112 in each stage 102, 104, and 106 of the switching fabric 100.

At 306, a logic unit of switch elements is grouped or implemented on a single discrete logic device. For example, the upper row 120 of switch elements 108, 110, and 112 are grouped into a logic unit 114 for implementation on one integrated logic device. Rows 122 and 124 of switch elements 108, 110, and 112 are grouped into corresponding logic units 116 and 118 for implementation on corresponding logic devices. The logic units 114, 116 and 118 may have inter-stage connections that are embedded within a logic device and/or inter-stage connections that are remote or external to the logic device. The connections embedded internal within a single logic device are referred to as intra-device connections. Connections external to a logic device are referred to as inter-device connections. The inter-device connections may be through cables, along traces of a printed circuit board, through external interconnect logic and the like.

At 308, the logic devices from the various rows are interconnected to one another based on a predetermined routing pattern to provide the inter-stage connections of the switching fabric 100. For example, the logic device corresponding to logic unit 114 has inter-device connections for the inter-stage connections 126, 128, 130, 132, 134, 136, 138, and 140 to the logic devices corresponding to the logic units 116 and 118. The routing pattern may be implemented utilizing external cables and/or by setting states of internal and/or external selectors. The routing pattern may be changed by re-arranging external cables or by changing states of internal or external selectors. When selectors are used, the routing pattern may be changed without the need to change any external cables.

Next the process of FIG. 3 will be described in connection with the switching fabric 200. At 302, a multi-stage switch fabric is defined, e.g. switch fabric 200. The layout of the logic for the switch fabric 200 is organized into the individual stages 202, 204, and 206 comprising switch elements 208, 210, and 212 correspondingly. The defining characteristics include 32 inputs, 32 outputs, three stages, four 8×12 stage-1 switch elements 208, twelve 4-by-4 stage-2 switch elements 210, four 12-by-8 stage-3 switch elements 212 and the routing pattern 201.

At 304 of the flowchart 300 of FIG. 3, the multi-stage switching fabric 200 is horizontally sliced at the horizontal lines 260, 262 and 264 into logic units 270, 272, 274 and 276. Each logic unit 270 is comprised of one 8-by-12 switch element 208 in the first stage 202, three 4-by-4 switch elements 210 grouped in the second stage 204, and one 12-by-8 switch element 212 in the third stage 206. The switch elements 208, 210 and 212 of the logic units 270, 272, 274 and 276 are grouped at 306 for implementing into corresponding logic device, 278, 280, 282 and 284. The logic devices 278 to 284 are interconnected with one another at 308 based on the routing pattern 201 to form the switching fabric 200.

Alternatively, the switching fabric 200 could be horizontally sliced only at the horizontal line 262. For this case, one larger logic unit would contain smaller logic units 270 and 272, while another larger logic unit would contain smaller logic units 274 and 276. The larger logic unit containing smaller logic units 270 and 272 would then be implemented in one logic device, and the other larger logic unit containing smaller logic units 274 and 276 would be implemented into another logic device. For this case, only two logic devices are required in order to construct the 200 switching fabric that was previously implemented with the four logic devices 278 to 284.

In the embodiment of FIG. 2, each of the logic units 270 to 276 implement a different partial routing pattern 286-289. The partial routing pattern 286 includes the inter-stage connections between the switch elements 208, 210 and 212 in the logic unit 270. The partial routing pattern 286 includes a lead or stage-1 to stage-2 configuration 286a of inter-stage connections between the first and second stages 202 and 204, and a tail or stage-2 to stage-3 configuration 286b of inter-stage connections between the second and third stages 204 and 206. The partial routing patterns 287-289, each also include stage-1 to stage-2 and stage-2 to stage-3 configurations of inter-stage connections.

For example, in the logic unit 270, the top output 203 of the stage-1 switch element SE #1 is routed internal to the logic unit 270. The top output 281 of the stage-1 switch element SE #2 is routed external to the logic unit 272. Multiple paths may be provided to connect an input 298 to an output 299 whereby some of the paths are with a logic device, and other paths are external to the logic device. In the example of FIG. 2 the inter-stage connections extending between the logic devices 278, 280, 282 and 284 represent inter-device connections (generally denoted at 290, 291 and 292).

Figure 4:
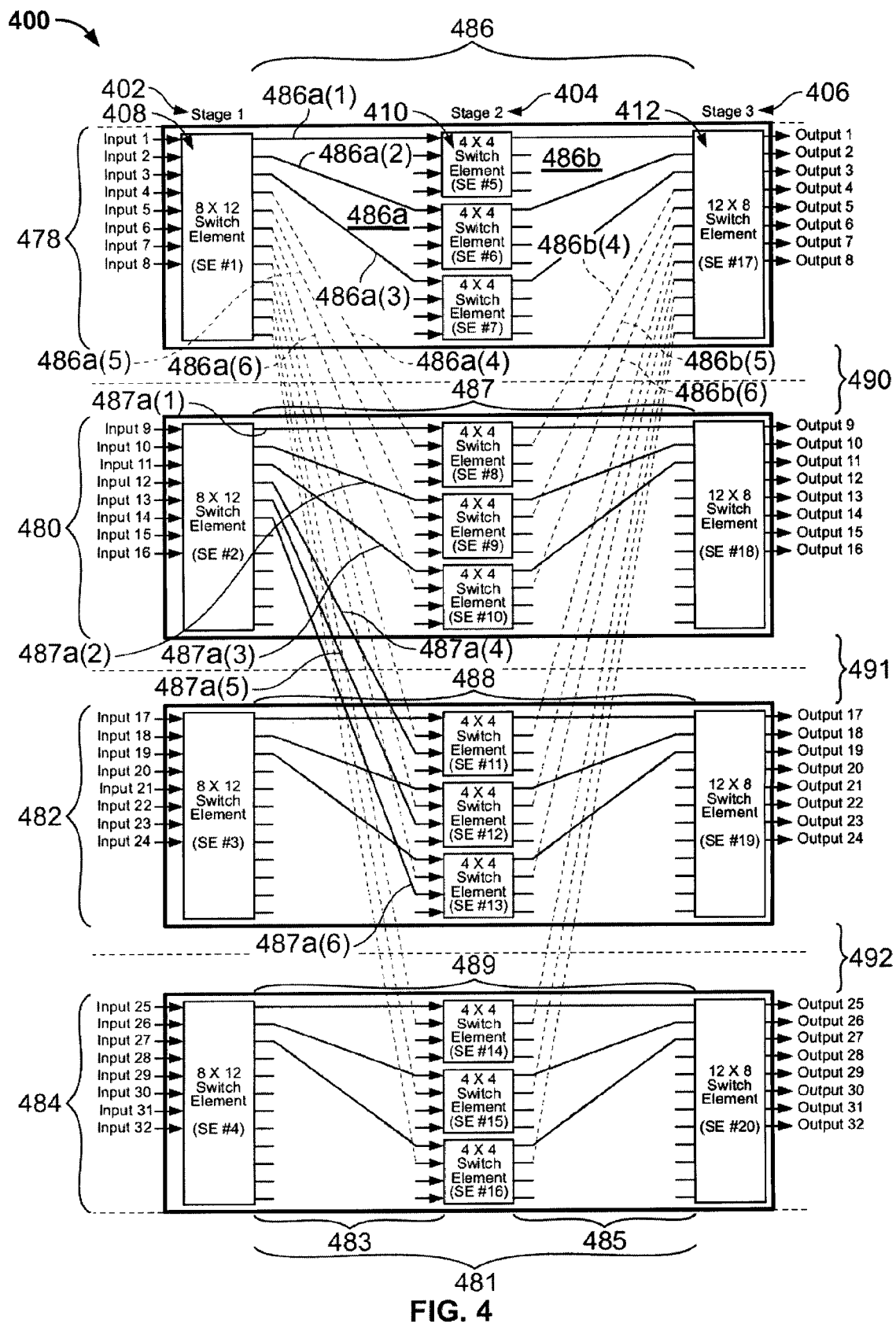
FIG. 4 illustrates an alternative three-stage 32-by-32 switching fabric separated horizontally into logic rows or slices, in accordance with the flowchart of FIG. 3.

FIG. 4 illustrates a switching fabric 400 formed in accordance with an alternative embodiment whereby each logic device contains an identical intra-device routing pattern. The switching fabric 400 includes first, second and third stages 402, 404 and 406, comprised of switch elements 408, 410, and 412, respectively. The switch elements 408, 410 and 412 are partitioned or sliced into logical units 478, 480, 482 and 484 for implementation on separate discrete logic devices. Logical units 478, 480, 482 and 484 include partial routing patterns 486, 487, 488 and 489, respectively, interconnecting the switching elements 408, 410, 412. Inter-stage connections between the logic units 478, 480, 482 and 484 represent inter-device connections (generally denoted at 490, 491 and 492). To simplify the illustration, several inter-stage connections are not shown.

Each logic unit 478, 480, 482 and 484 is comprised of stage-1, stage-2 and stage-3 switching elements. The switch fabric 400 utilizes a routing pattern 481 comprised of a stage-1 to stage-2 routing pattern 483 and a stage-2 to a stage-3 routing pattern 485. For example, in the logic unit 478, the partial routing pattern 486 includes a lead configuration 486a and a tail configuration 486b of connections. FIG. 4 only illustrates the portion of the lead configuration 486a that comprises the inter-stage connections extending from the stage-1 switch element SE#1.

In the embodiment of FIG. 4, the partial routing patterns 486, 487, 488 and 489 include identical intra-device route sub-sets in each of the logic units 478, 480, 482 and 484. The intra-device route sub-sets utilize identical inter-stage, intra-device routing paths between groups of switch element outputs and later-stage switch element inputs in a common logic device. For example, in each of the logic units 478, 480, 482 and 484, a first subset of inter-stage connections 486a(1) to 486a(3) extends from the first three consecutive outputs of the stage-1 switch element SE#1 to the first input of each of separate stage-2 switch elements SE#5, SE#6 and SE#7, respectively, in the logic unit 478. Similarly, a subset of inter-state connections 487a(1) to 487a(3) extends from the first three consecutive outputs of the stage-1 switch element SE#2 to the first input of each of separate stage-2 switch elements SE#8, SE#9 and SE#10. The inter-stage, intra-device route sub-sets between the outputs of the stage-2 switch elements 404 and the inputs of the stage-3 switch elements 406 may also be identical (as shown in FIG. 4).

A second subset of inter-stage connections 486a(4) to 486a(6) extends from the second three consecutive outputs of the switch element SE#1 to the second input of each of the separate stage-2 switch elements SE#8 to SE#10 in the logic unit 480. A second subset of inter-stage connections 487a(4) to 487a(6) extend from the second three consecutive outputs of the switch element SE #2 to the third input of each of the switch elements SE #11 to SE #13, and so on. Inter-device connections are connected in this manner until k paths exist between each stage-1 switch element and each stage-3 switch element.

Figure 5:
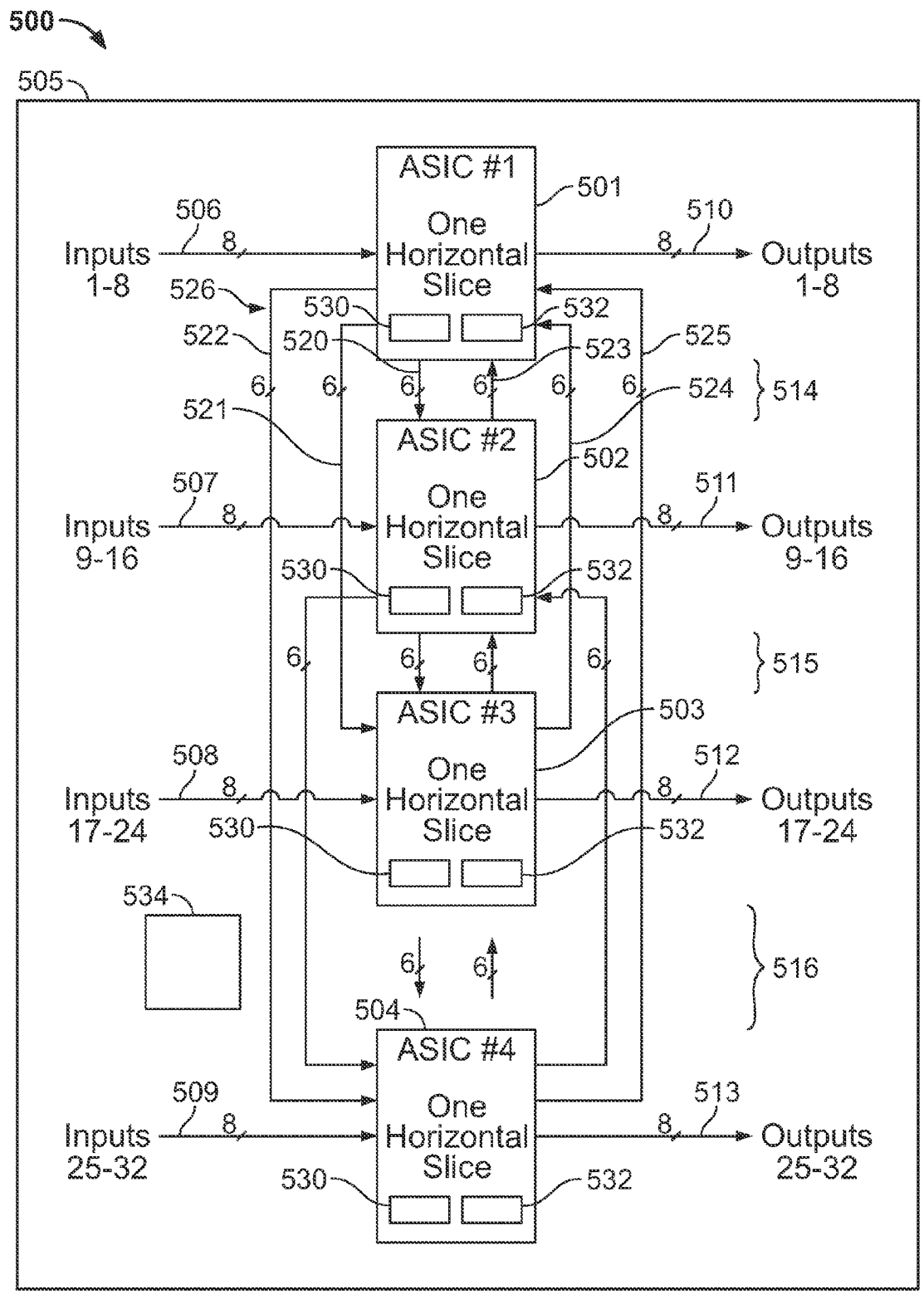
FIG. 5 illustrates a block diagram of a switch system of ASICs implementing the switching fabric of FIG. 4.

FIG. 5 illustrates a block diagram of a switching system 500 implemented in accordance with an embodiment. The switching system 500 includes logic devices 501-504 (e.g. ASICs, FPGAs, gate arrays, ASSPs, etc). The logic devices 501-504 may be mounted on a common printed circuit board 505 or on multiple printed circuit boards. Each logic device 501-504 includes device inputs 506-509 for receiving external incoming signals entering the switching fabric and device outputs 510-513 for producing outgoing signals leaving the switching fabric.

The logic devices 501-504 correspond to logic units 478, 480, 482 and 484 of FIG. 4, respectively, and as such each contain stage-1, stage-2, and stage-3 switch elements. The device inputs 506 are joined to the eight inputs to the switch element SE#1 in logic unit 478 of FIG. 4. The device outputs 510 are joined to the eight outputs from switch element SE#17 in the logic unit 478. Likewise, the device inputs 507 and device outputs 511 of the logic device 502 are joined to the inputs and outputs of switch elements SE#2 and SE#18, respectively, in the logic unit 480. The device inputs 508 and device outputs 512 are joined to the inputs and outputs of switch elements SE#3 and SE#19 in logic unit 482, while the device inputs 509 and device outputs 513 are joined to the inputs and outputs of switch elements SE#4 and SE#20 in the logic unit 484.

The logic devices 501-504 are interconnected through inter-device connections 514-516. The inter-device connections 514 include connection groups 520-525. In the example of FIG. 5, each connection group 520-525 includes six individual inter-device connections, three of which extend between stage-1 and stage-2 switch elements and three of which extend between stage-2 and stage-3 switch elements. For example, the connection group 520 includes, with reference to FIG. 4, the three inter-stage connections 486a(4) to 486a(6) extending between switch element SE#1 and switch elements SE#8 -SE#10 and three other inter-stage connections extending between switch elements SE#5 to SE#7 and SE#18 (connections not shown). Connection group 523 includes the three inter-stage connections 486b(4) to 486b(6) extending between switch elements SE#8 -SE#10 and switch element SE#17 and three other inter-stage connections extending between switch element SE#2 and switch elements SE#5 to SE#7 (connections not shown). The inter-device connections may extend along traces (generally denoted 526) on the PCB 505.

In the embodiment of FIG. 5, a large number of the inter-stage connections are embedded within the logic devices 501-504, and thus are not shown, thereby reducing the number of connections between logic devices. Since the embedded inter-stage connections are identical within devices 501 to 504, a single device type can be used to implement devices 501 to 504.

Optionally, each logic device 501-504 may include memory 530 for storing multiple switch fabric routing patterns, only one switch fabric routing pattern of which is selected and implemented at any one point in time. When the logic devices 501-504 store multiple routing patterns, each logic device may further be provided with routing path selectors 532 to select one of the multiple routing patterns. The memory is then used to set the states of the routing path selectors. Optionally, memory is not required within the ASICs in order to create multiple routing patterns internal to a single logic device. For instance, instead of using internal memory to set the states of the routing path selectors, external pins may be used. Optionally, an external interconnect unit 534 may be provided on the printed circuit board 505 and utilized to implement external routing path selectors used to select a routing pattern for the logic devices 501-504.

Various alternatives exist for setting the internal routing path selectors. The logic device may be substantially unique, with the internal routing path selectors set differently from one manufactured logic device/chip to the next. This alternative embodiment allows for substantially unique logic devices, but for the settings of the internal selectors that determine the routing pattern. Alternatively, the logic device may be provisioned with the selection of the inter-stage routing pattern after the device is created/manufactured. For example, memory (e.g. EPROM) may be used in the logic device that can be programmed after the device is created to select the inter-stage routing pattern for the device. Alternatively, a set of input pins may be provided to the device that determines the inter-stage routing pattern for the device.

Figure 6:
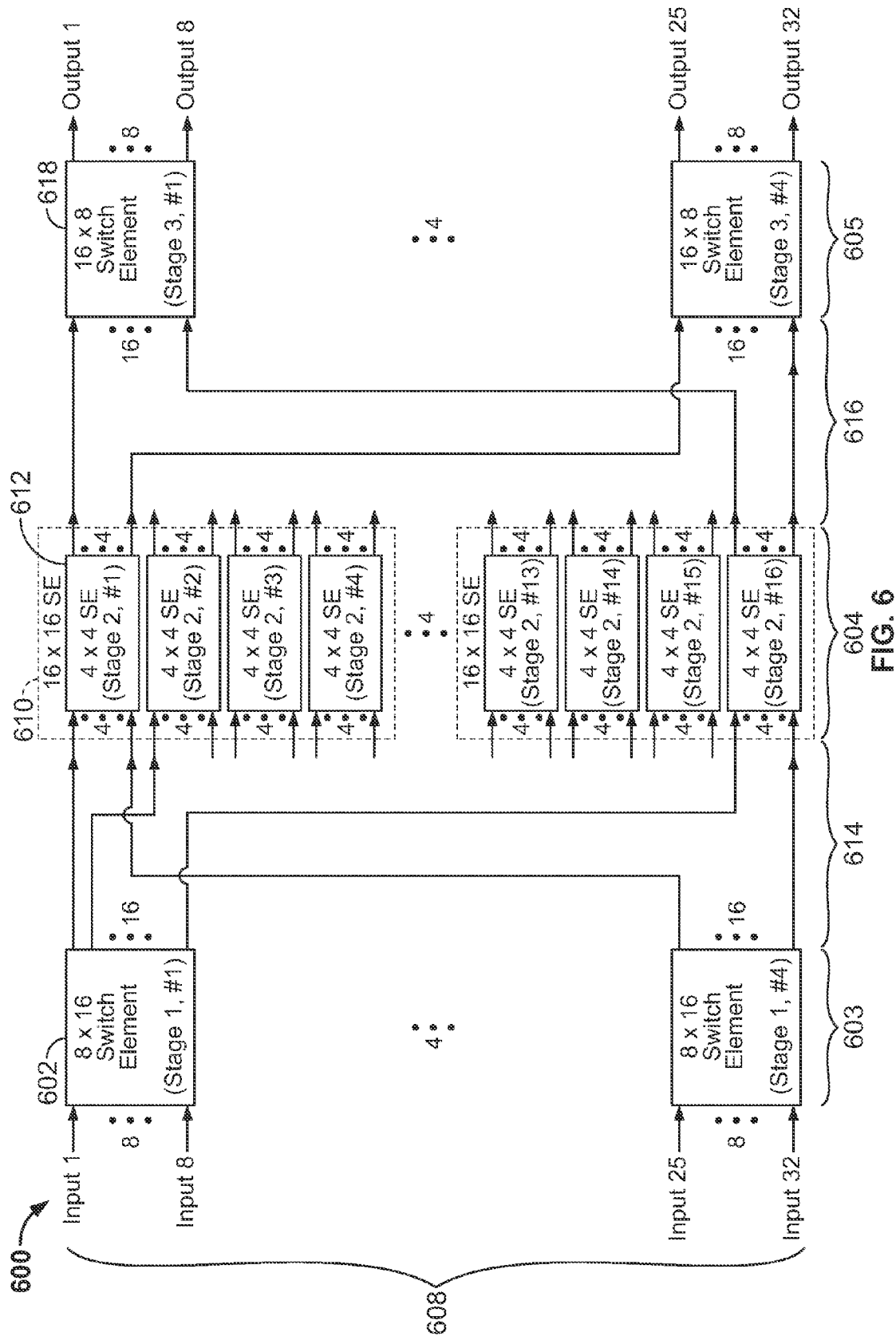
FIG. 6 illustrates a block diagram of an expandable 32-by-32 switching fabric configured to be contained in a single logic device.
Figure 7:
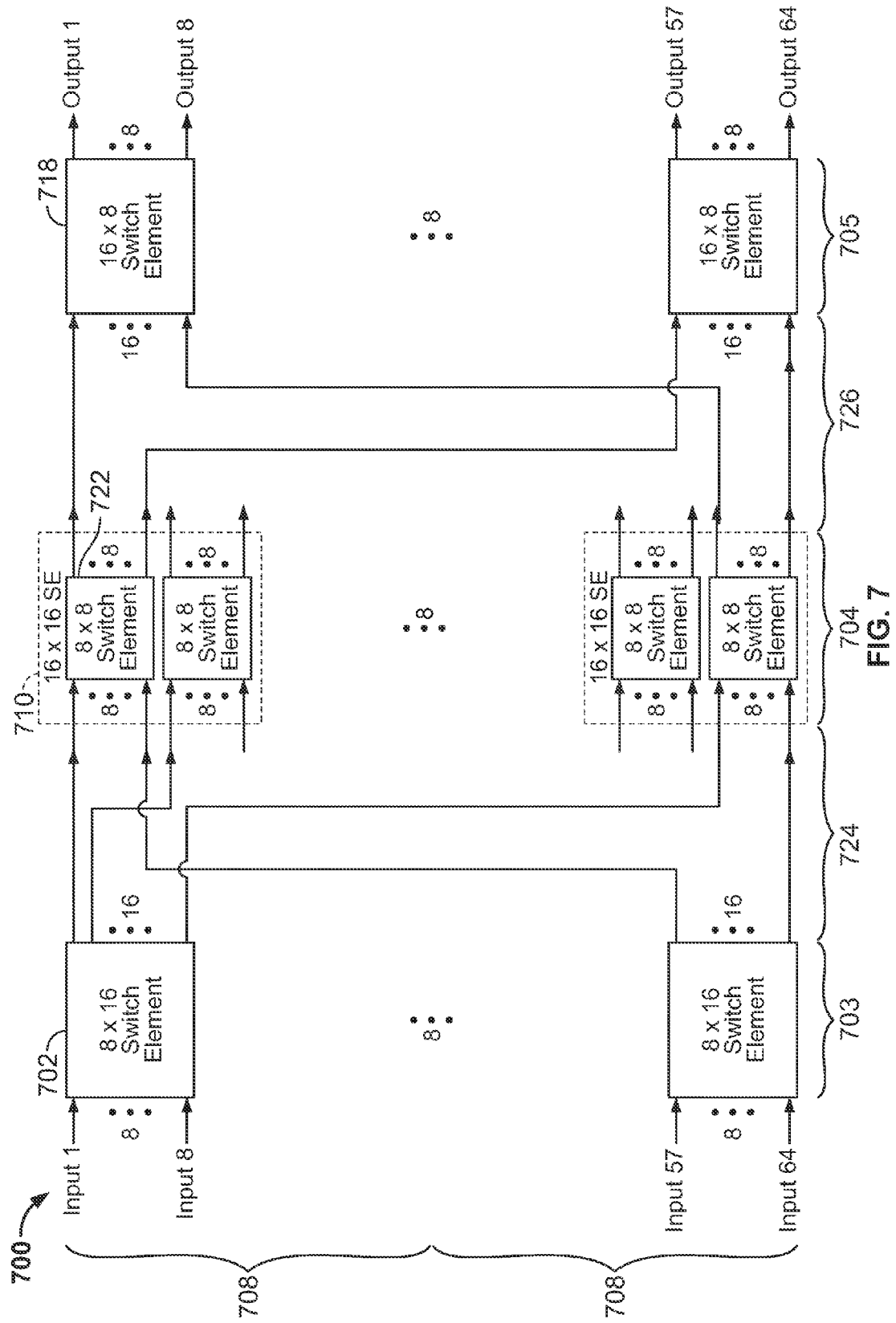
FIG. 7 illustrates a block diagram of an expandable 64-by-64 switching fabric implemented using two logic devices of FIG. 6.
Figure 8:
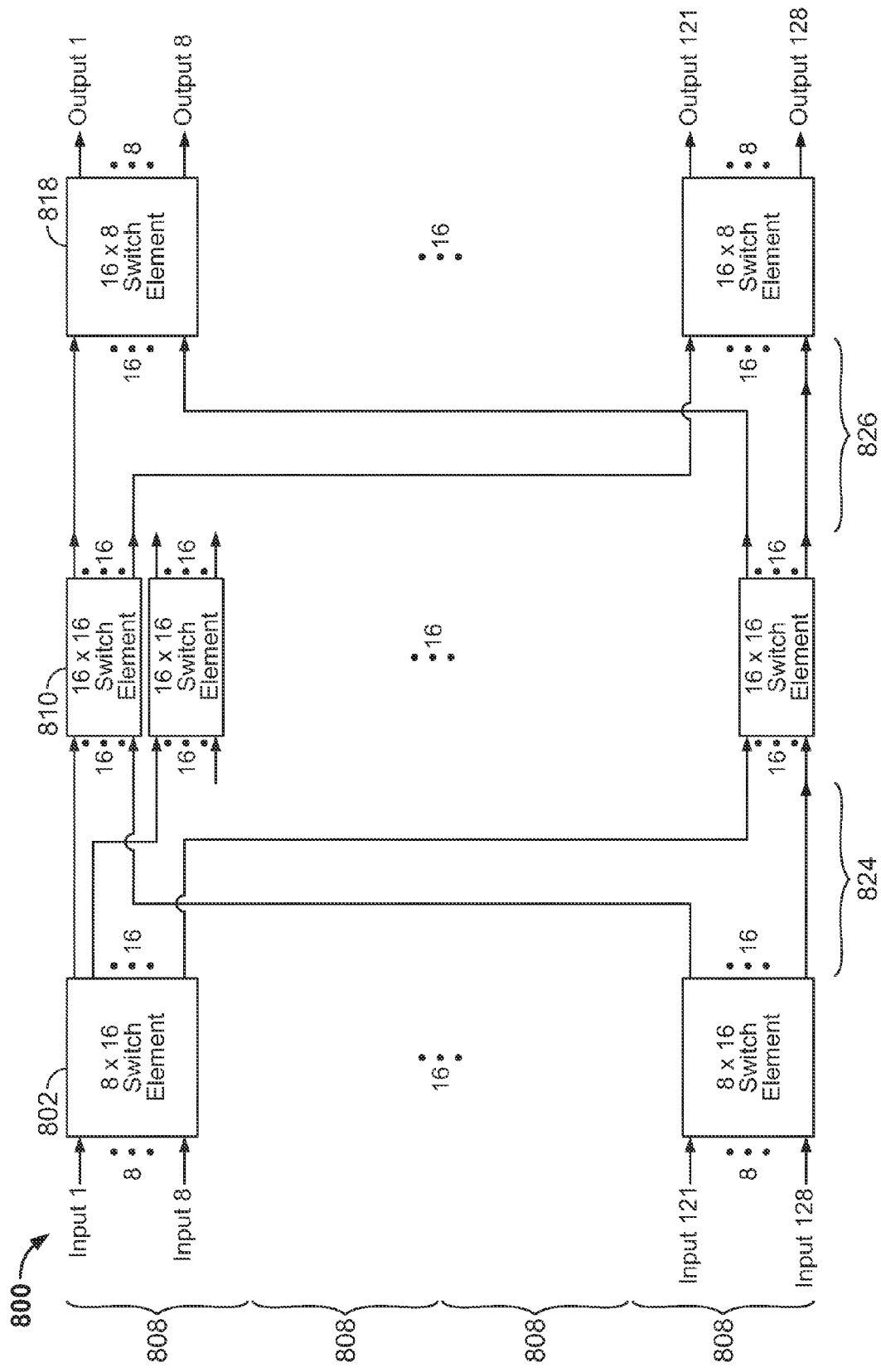
FIG. 8 illustrates a block of a 128-by-128 switching fabric implemented using four logic devices of FIG. 6.

FIGS. 6, 7, and 8 illustrate a switch system in accordance with an alternative embodiment that may be reconfigured in a scalable manner to vary the size of the switching fabric.

FIG. 6 illustrates a block diagram of a multistage switch system 600 configured to implement an expandable switch fabric. The switch system 700 includes three stages 603-605 of switch elements 602, 610 and 618. The switch system 600 is implemented entirely on a single logic device. The switch elements 602, 610 and 618 may be configured to operate as a stand-alone 32-by-32 switch fabric (FIG. 6), or expanded to a 64-by-64 switch fabric (FIG. 7) or a 128-by-128 switch fabric (FIG. 8). The stage-1 switch elements 602 are configured to operate each as an 8-by-16 matrix. The stage-2 switch elements 610 are configured to operate each as a 16-by-16 matrix, while the stage-3 switch elements 618 are configured to operate each as a 16-by-8 matrix. The logic device 600 may externally route all inter-stage connections. For example, the outputs from the stage-1 switch elements 602 are routed to pins or contacts of the logic device 600 along external lines, back through pins or contacts of the logic device 600 to the inputs of the stage-2 switch elements 610. The outputs from the stage-2 switch elements 610 are routed to pins or contacts of the logic device 600 along external lines, back through pins or contacts of the logic device 600 to the inputs of the stage-3 switch elements 618.

In the embodiment of FIG. 6, the switch elements 610 of the second stage 604 are each configured as a 16-by-16 matrix. In addition, each switch element 610 is further logically partitioned into four 4-by-4 sub-switch elements 612. To build a sub-switch element, the potential connections from a sub-set of the switch element inputs is limited to a predetermined subset of the switch element outputs. As an example, consider a 4-by-4 switch element logically partitioned into two 2-by-2 sub-switch elements. The potential connections for the first and second inputs of the 4-by-4 switch element are limited to the first and second outputs of the 4-by-4 switch element, while the third and fourth inputs can only be connected to the third and fourth outputs.

The stage-1 switch elements 602 and stage-2 sub-switch elements 612 are interconnected utilizing a stage-1 to stage-2 routing pattern 614, while the stage-2 sub-switch elements 612 and the stage-3 switch elements 618 are interconnected utilizing a stage-2 to stage-3 routing pattern 616. By way of example only, the routing patterns 614 and 616 may combine to form a traditional CLOS interconnect routing pattern, as taught by Bellamy.

FIG. 7 illustrates a switch system 700 configured to implement a 64×64 switch fabric using two logic devices 708. The logic devices 708 have groupings of switch elements identical to the groupings in the logic device 608, and the stage-2 switch elements 610 are logically partitioned into four 4-by-4 sub-switch elements 612 in FIG. 6, but the stage-2 switch elements 710 are logically partitioned into two 8-by-8 sub-switch elements 722 in FIG. 7. The switch system 700 includes first, second and third stages 703-705. The first, second and third stages 703-705 comprise switch elements 702, 710 and 718. The stage-1 switch elements 702 and stage-3 switch elements 718 are each configured as an 8-by-16 matrix and a 16-by-8 matrix, respectively, as in the configuration of FIG. 6. The stage-2 switch elements 710 are each configured as a 16-by-16 matrix. Each stage-2 switch element 710 is logically partitioned to include two 8-by-8 switch elements 722. The switch system 700 has eight 8-by-16 stage-1 switch elements 702, eight 16-by-16 stage-2 switch elements 710, and eight 16-by-8 stage-3 switch elements 718. The stage-1 switch elements 702 and stage-2 sub-switch elements 722 are interconnected utilizing a stage-1 to stage-2 routing pattern 724, while the stage-2 sub-switch elements 722 and the stage-3 switch elements 718 are interconnected utilizing a stage-2 to stage-3 routing pattern 726. The routing patterns 724 and 726 are different from the routing patterns 614 and 616 (FIG. 6).

The switch system 600 of FIG. 6 is implemented on a single logic device 608, while the stage-2 switch elements 610 are logically partitioned into sub-switch elements configured to offer a first switch fabric size. To increase the switch fabric size, multiple identical logic devices 608 may be interconnected. For example, when logic device 608 in FIG. 6 offers a 32-by-32 switch fabric size, two logic devices 708 may be interconnected as shown in FIG. 7 to expand the switch fabric size to a 64-by-64 matrix. The switch fabric size can be scaled from a 32-by-32 to a 64-by-64 by doubling the number of logic deices 608, logically repartitioning the stage-2 sub-switch elements to double the size of each sub-switch element, and changing the routing pattern from 614-616 to 724-726.

FIG. 8 illustrates a 128-by-128 switch system 800 implemented with four logic devices 808, each of which is identical to the logic device 600 of FIG. 6. The switch system 800 includes sixteen 8-by-16 stage-1 switch elements 802, sixteen 16-by-16 stage-2 switch elements 810, and sixteen 16-by-8 stage-3 switch elements 818 evenly distributed between the four logic devices 808. Each stage is constructed with a grouping of switch elements identical to the switch element grouping of the logic device 608 of FIG. 6. The stage-2 switch elements 810 are not logically partitioned into smaller sub-switch elements. The switch elements 802, 810 and 818 are interconnected using routing patterns 824 and 826 which differ from the routing patterns 724 and 726 and 614 and 616.

In accordance with one embodiment, a single horizontally sliced logic device, e.g. the logic device 608, may be used to expand a switch fabric even after deployed in the field. For example, the switch system 600 may be initially deployed in the field for a particular application. The logic device 608 may be implemented on a first circuit pack that may be interconnected with one or more other circuit packs, each holding a separate logic device 608. Alternatively, the switch system 600 may be implemented upon a circuit board that allows additional logic devices 608 to be added. For example, the circuit board may include expansion sockets for the additional of logic devices. Expansion sockets enable the switch system 600 to be upgraded in the field from a 32×32 switch fabric to a 64-by-64 switch fabric by adding another logic device 608 to the circuit board (FIG. 7). The 64-by-64 switch fabric may be upgraded in the field to a 128-by-128 switch fabric by adding another two (total of four) logic devices 608 to the circuit board (FIG. 8).

By logically partitioning the second stage switch elements into sub-switch elements for the smaller 600 and 700 fabrics, the number of physical connection paths from a given first stage element to a given third stage element is kept at "k" number of paths regardless of the size of the fabric. This concept prevents existing sub-connections from having to be rerouted when a switch fabric is expanded from a smaller fabric to a larger fabric. Instead of rerouting sub-connections when expanding a fabric, the physical path carrying all sub-connections is physically moved. For instance, when fabric 600 is expanded to fabric 700, all sub-connections that were previously transported over the connection path consisting of the inter-stage connections 630 and 632 are now transported over the connection path consisting of inter-stage connections 730 and 732.

Figure 9:
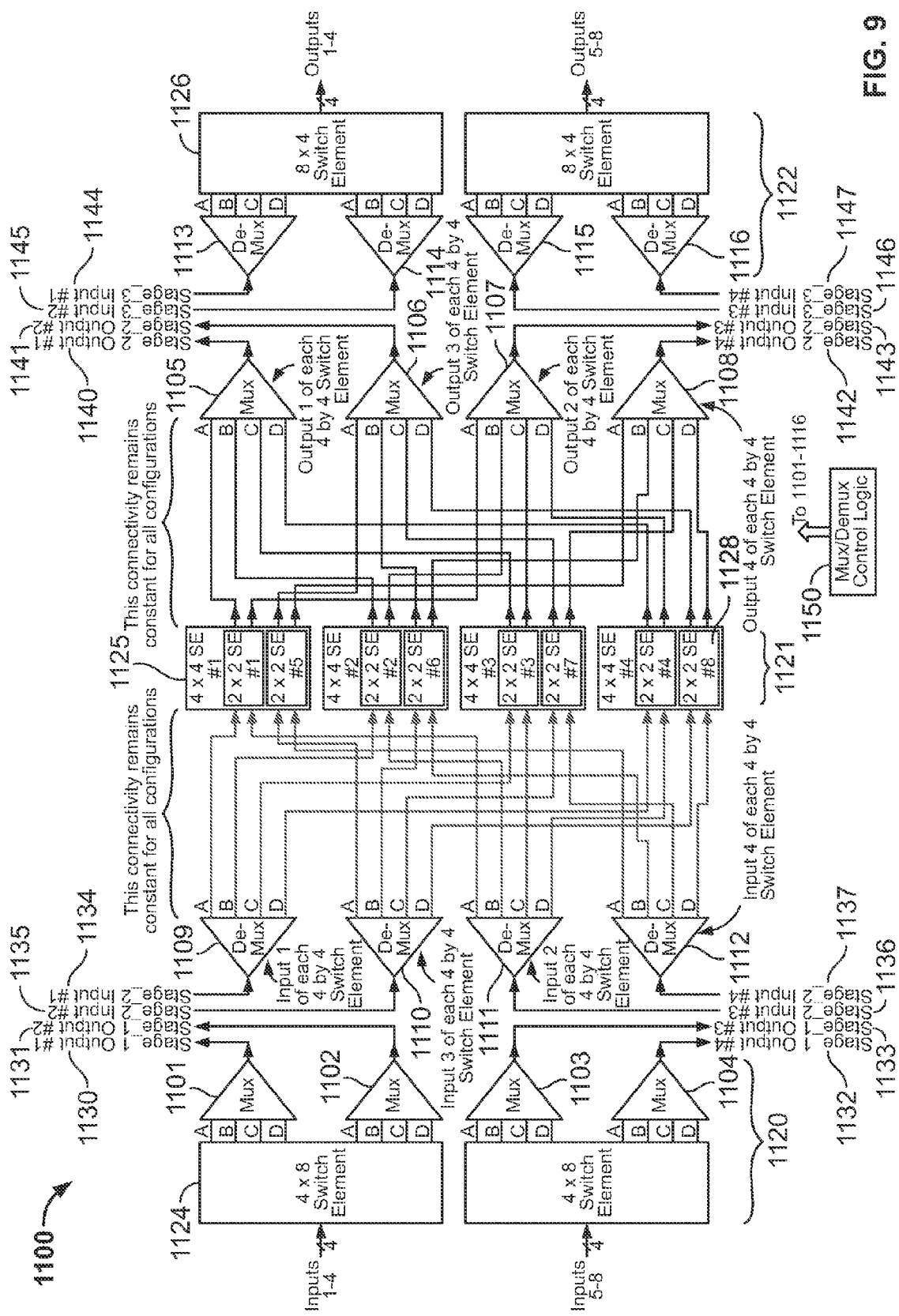
FIG. 9 illustrates a block diagram of an 8-by-8 switching fabric utilizing multiplexers and demultiplexers.

FIG. 9 illustrates an alternative embodiment for a logic device 1100 that is constructed to reduce the I/O pin count. First, second and third stages 1120-1122 includes switch elements of 1124-1126, where the stage-2 switch elements 1125 are 4-by-4 matrices that are logically partitioned into two 2-by-2 sub-switch elements 1128. The logic device 1100 includes signal multiplexers 1101-1108 and signal demultiplexers 1109-1116 that select between associated lines using traditional time division multiplexing techniques. The multiplexers 1101-1108 and demultiplexers 1109-1116 are illustrated as logical components that may be implemented as physical components or with other equivalent functional logic otherwise embedded within the logic device 1100. The multiplexers 1101-1108 and demultiplexers of 1109-1116 select between signals entering and leaving I/O pins or contacts on the logic device 1100 to reduce the device external I/O pin count, while increasing the rate of each I/O signal to four times the rate of the equivalent non-multiplexed signals. Multiplexer/demultiplexer control logic 1150 controls the multiplexers 1101-1108 and demultiplexers 1109-1116 to pass desired signals at the appropriate time, such as every internal byte period.

In the example of FIG. 9, the multiplexers 1101-1104 reduce the number of outputs 1130-1133 from the first stage 1120 from sixteen down to four, even though the first stage contains two 4-by-8 switch elements 1124. For example, the first four outputs from the first switch element 1124 are time division multiplexed at multiplexer 1101 and reduced to a single output 1130 operating at four times the rate of the individual non-multiplexed signals. The output 1130 may be provided at one I/O pin on the logic device 1100. The demultiplexers 1109-1112 reduce the number of inputs 1134-1137 to the second stage 1121 from sixteen down to four, even though the second stage 1121 contains four 4-by-4 switch elements 1125, each of which may be logically partitioned into two 2-by-2 sub-switch elements 1128. For example, the demultiplexer 1109 enables a single I/O pin to be used as the input 1134 for four inputs to the switch elements 1125. Multiplexers 1105-1108 reduce the number of outputs 1140-1143 for the second stage 1121 from 16 to four, while demultiplexers 1113-1116 reduce the number of inputs 1144-1147 for the third stage from 16 to four.

The I/O associated with a logic device may operate at a much higher rate than the internal logic within the device. Multiplexing multiple inter-logic device signals into a single higher rate signal allows for the use of a lesser number of I/O pins and a lesser amount of external signal routing, while allowing internal switching to occur at a lower clock frequency.

The stage inputs and outputs 1130-1147 may be interconnected in various configurations to implement various routing patterns as the switch fabric size expands or contracts.

Optionally, the outputs from switch elements in the first and second stages may be provided to a common multiplexer and multiplexed into a single time division multiplexed signal, when the stage-1 and stage-2 outputs are directed to a common logic device. Similarly, stage-2 and stage-3 input signals from a common logic device may be multiplexed into a single time division multiplexed signal and directed to a common demultiplexer within a logic device.

It can be observed from FIG. 9 that a stand-alone 8 by 8 switch fabric that is interconnected via a traditional CLOS interconnect routing pattern can be implemented via 1100 by directly connecting 1130 to 1134, 1131 to 1135, 1133 to 1136, 1132 to 1137, 1140 to 1144, 1141 to 1145, 1143 to 1146, and 1142 to 1147.

Figure 10A:
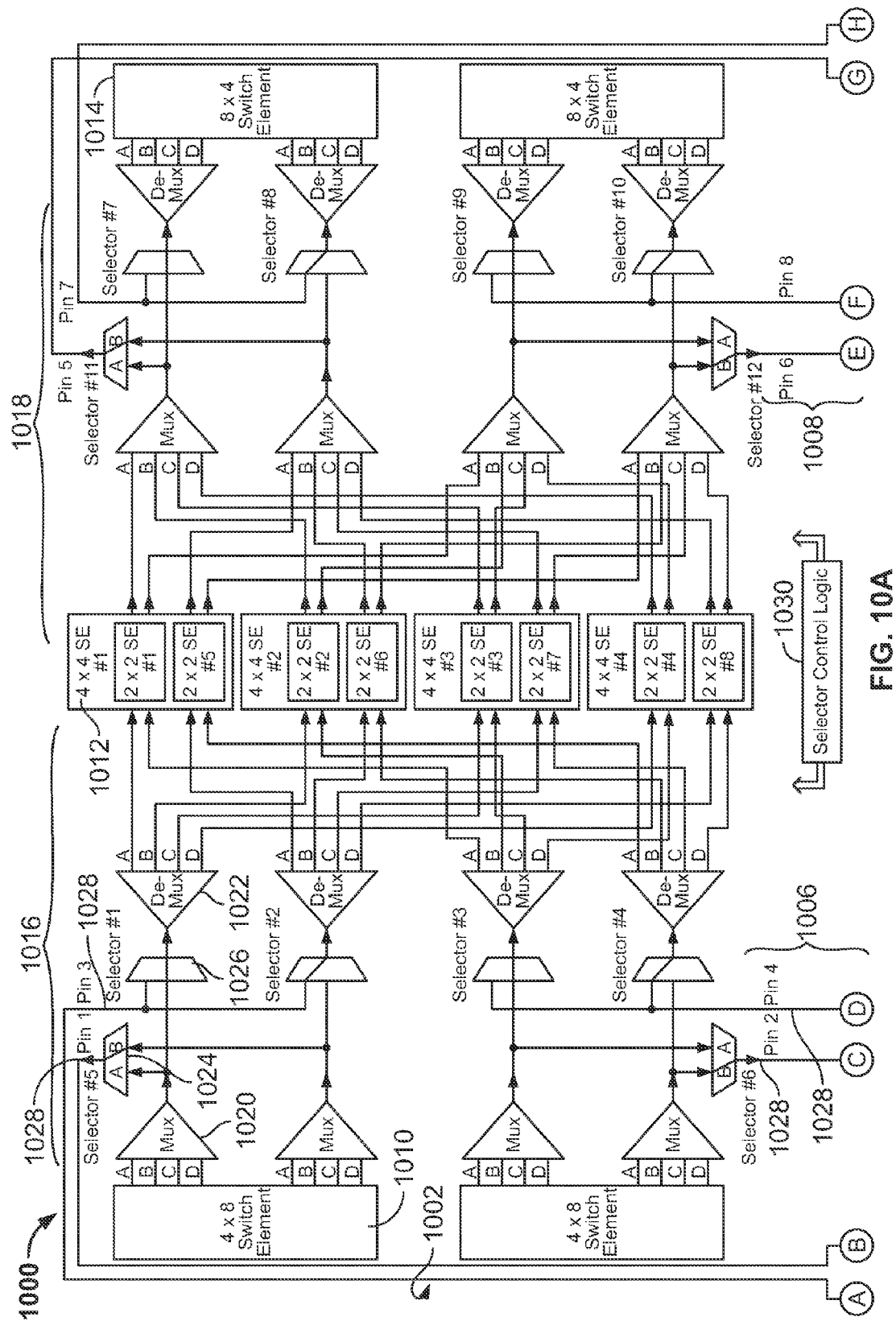
FIGS. 10A and 10B illustrate a block diagram of a 16-by-16 switching fabric utilizing selectors and selector logic to interconnect logic devices.
Figure 10B:
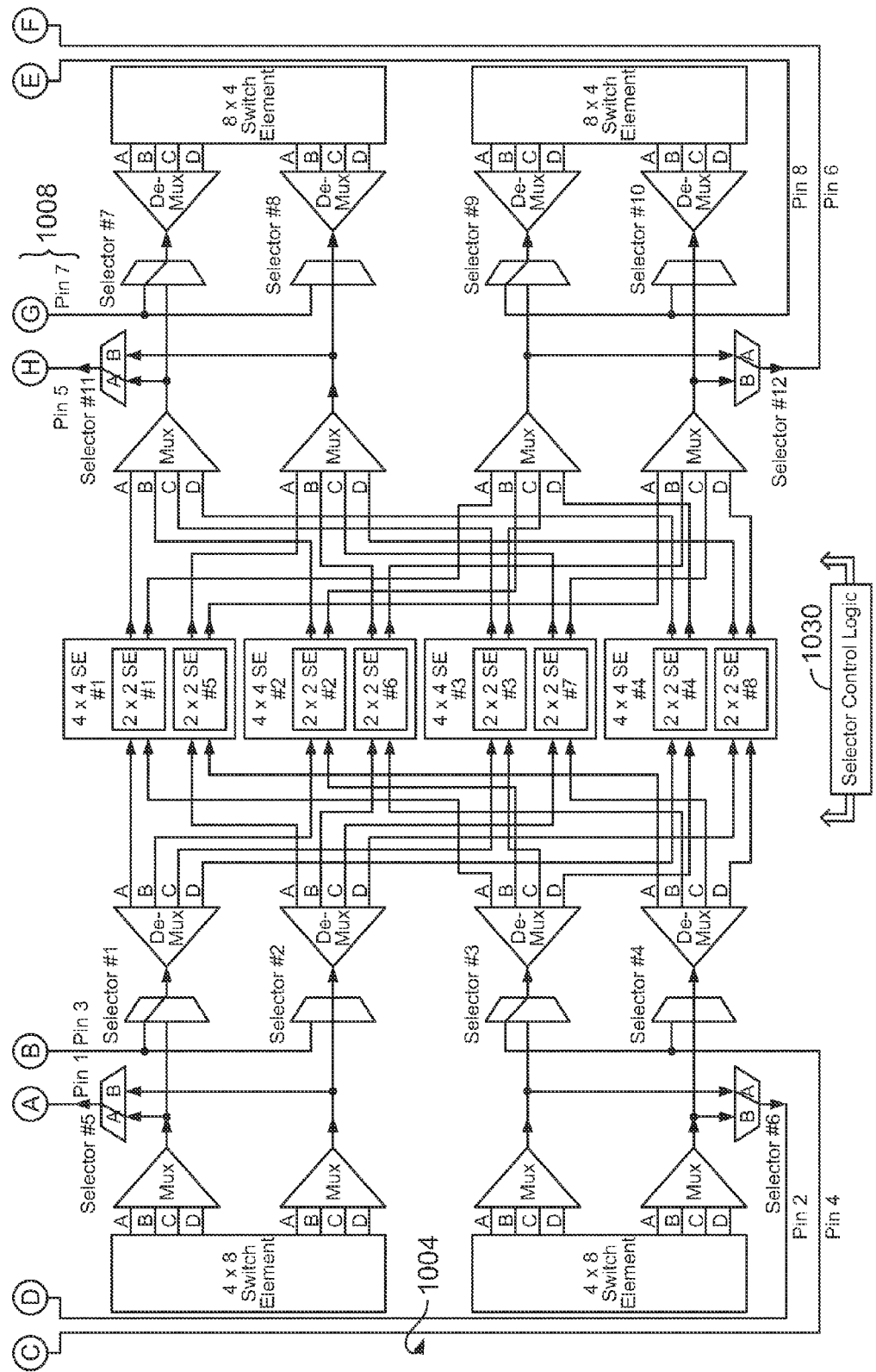

FIGS. 10A and 10B illustrate an alternative embodiment of a switching system 1000 that affords a shared I/O pin configuration. The switch system 1000 includes identical logic devices 1002 and 1004 joined through inter-device connections 1006 and 1008. Logic devices 1002 and 1004 are identical to logic device 1100, with the exception that internal routing path selectors are incorporated into the 1002 and 1004 devices. Stage-1 and stage-2 switch elements 1010 and 1012 are joined through inter-stage connections 1016, while stage-2 and stage-3 switch elements 1012 and 1014 are joined through inter-stage connections 1018. Multiplexers 1020 and de-multiplexers 1022 perform time division multiplexing upon the switch element inputs and outputs as explained above in connection with FIG. 9. The outputs of the multiplexers 1020 are provided to output routing path selectors 1024 and input routing path selectors 1026. A state of each output routing path selector 1024 is set by selector control logic 1030 to choose/select between the inputs, which represent outputs of multiplexers 1020. Based on the state of the selector 1024 the output of a selected one of the multiplexers 1020 is provide to a corresponding I/O pin 1028 on the logic device 1002 or 1004.

A state of each input routing path selector 1026 is set by selector control logic 1030 to choose/select between the inputs, which may be an I/O pin 1028 and an output of an associated multiplexer 1020. Based on the state of the selector 1026 the output of a selected one of the multiplexers 1020 and I/O pin 1028 is provide to a corresponding demultiplexer 1022 on the logic device 1002 or 1004.

FIGS. 10A and 10B illustrate an exemplary set of selector states and I/O pin interconnections. For example, the state (denoted input B) of selector #5 in logic device 1002 is set to statically pass the output of the second multiplexer 1020 joined to the first switch element 1010 to I/O pin #1. The I/O pin #1 on logic device 1002 is connected to I/O pin 3 on logic device 1004, which statically passes through selector #1 in logic device 1004 to the first demultiplexer coupled to the stage-2 switch elements. The routing path selectors 1024 and 1026 enable the number of I/O pins to be reduced by statically sharing I/O pins 1028 between time division multiplexed signals, depending upon the configured operation of the logic devices.

It can be noted that device 1002 can be configured as a stand-alone 8 by 8 switch fabric without the use of external cables or external interconnect units or external PCB traces. This can be accomplished by statically configuring Selectors #1 through Selector #4 and Selector #7 through Selector #10 to select their corresponding lower selector input.

In order to latter expand the stand-alone 8 by 8 fabric implemented with device 1002 to a 16 by 16 fabric, device 1004 can be connected to device 1002, as shown in FIG. 10. Selector #2, #4, #8, and #10 of device 1002 would then be reconfigured such that they now each select their corresponding upper selector inputs (as indicated in FIGS. 10A and 10B via the lines drawn through each selector). Selectors #5, #6, #11, and #12 of device 1002 would be configured to select their corresponding "B" selector input (as indicated in FIGS. 10A and 10B via the lines drawn through each selector). In a similar manner, the Selectors #1 to #12 of device 1004 would be configured as depicted in FIGS. 10A and 10B (as indicated via the lines drawn through each selector). Therefore, FIGS. 10A and 10B illustrate the use of internal routing path selectors to both implement and change routing patterns. (It should be noted that the interconnect 1006 and 1008 between device 1002 and device 1004 could be present in a fixed manner prior to the expansion of the 8 by 8 fabric to the 16 by 16 fabric. The fixed interconnections could be for instance implemented via backplane PCB traces for the case where each switch device resided on a separate circuit pack which plugged into the backplane containing the interconnect PCB traces.) FIGS. 10A and 10B further illustrate how a single device type with internal routing path selectors (and without the use of movable external cables or external interconnect units) can be utilized for three different applications: i.e., as a stand-alone 8 by 8 switch fabric, as the top portion of a 16 by 16 switch fabric, and as the bottom portion of an 16 by 16 switch fabric.

Like in the case of devices 1002 and 1004, the FIG. 9 device 1100 can be used to implement a stand alone 8 by 8 fabric (using one device) or a 16 by 16 fabric (using two 1100 devices), or to expand from one fabric size to a larger fabric size. However, either external movable cables or external interconnect units must be used in order to expand from one fabric size to a larger fabric size using the FIG. 9 device 1100, while the devices 1002 and 1004 require neither movable cables nor external interconnect units in order to construct the two fabric types or expand from one fabric size to another fabric size.

FIGS. 10A and 10B further illustrate how a set of 4 by 4 stage-2 switch elements can be initially logically partitioned as two 2-by-2 stage-2 switch elements for use in a smaller fabric, and then later used as 4-by-4 stage-2 switch elements within an expanded fabric, by simply changing the states of the internal routing path selectors. In FIG. 10, when device 1002 is configured as a stand-alone 8 by 8 fabric (by configuring Selectors #1 through #4 and #7 through #10 to select their corresponding lower selector inputs), it can be seen that each stage-1 switch element 1010 connects to each stage-2 2-by-2 sub-switch element, via a traditional CLOS interconnect routing pattern. Similarly, it can be seen that each stage-3 switch element 1014 connects to each stage-2 2-by-2 sub-switch element, via a traditional CLOS interconnect routing pattern. When the stand-alone 8 by 8 fabric is expanded to the 16 by 16 fabric, such as the configuration shown in FIG. 10, it can be seen from FIGS. 10A and 10B that each stage-1 switch element 1010 now connects to each stage-2 4-by-4 switch element, via a traditional CLOS interconnect routing pattern. Similarly, it can be seen from FIGS. 10A and 10B that each stage-3 switch element 1014 now connects to each stage-2 4-by-4 switch element, via a traditional CLOS interconnect routing pattern. (It should be noted that when the output of a multiplexer 1020 is connected to the input of a demultiplexer 1022 via a selector or set of selectors, the signals "A" to "D" of the multiplexer are connected to the corresponding signals "A" to "D" of the demultiplexer.)

It can be noted that the FIG. 9 device 1100 requires 16 I/O pins, while devices 1002 and 1004 each only require 8 I/O pins. Therefore, FIGS. 10A and 10B further illustrate how device pins can be shared using statically configurable selectors such that a reconfigurable switch device can be implemented with reduced number of I/O pins.

Although the switching fabrics described above utilize three stages, optionally two stages or more than three stages may be utilized. A 32-by-32 three-stage switch fabric 200 is used as an example of the multi-stage switching fabric 100, but other array sizes are applicable, e.g. 64-by-64 or 128-by-128. The horizontal slicing method and resulting device configuration may be used for multi-stage switching fabrics (such as CLOS networks) of numerous stages and rectangular array sizes. Although a horizontal slicing method is used herein to exemplify an embodiment of the invention, other slicing methods, e.g. a diagonal slicing method, may be employed whereby the switching elements of the multiple stages are included in a slice. For example, a diagonal slice may be chosen with SE #1 for the stage-1 switch element, SE #8-SE #10 for the stage-2 switch elements, and SE #19 for the stage-3 switch element. Another diagonal slice may be provided from SE #2 for the stage-1 element 208, SE #11-SE #13 for the stage-2 switch elements, and SE #20 for the stage-3 switch element. A third diagonal slice may be provided from SE #3 for the stage-1 switch element 208, SE #14-SE #16 for the stage-2 switch elements, and SE #17 for the stage-3 switch element. A fourth diagonal slice may be provided from SE #4 for the stage-1 switch element, SE #5-SE #7 for the stage-2 switch elements, and SE #18 for the stage-3 switch element.

While the invention has been described in terms of various specific embodiments, those skilled in the art will recognize that the invention can be practiced with modification within the spirit and scope of the claims.

What is claimed is:

1. A switching fabric configured to operate as at least a first size fabric and a second size fabric, the switching fabric having transmission inputs and transmission outputs to and from the switching fabric, the switching fabric comprising:
a first and a second logic device, each of the first and second logic devices including at least two switch elements, at least one of two switch elements being partitioned into smaller sub-switch elements when the switching fabric is operated as a first size fabric, and at least one of the two switch elements not being partitioned into smaller sub-switch elements when the switching fabric is operated as a second size fabric, wherein a quantity of paths through the switching fabric from each transmission input to each transmission output remains constant for each switch fabric size; and
a selector device transmitting signals from the second logic device to a respective output of the first logic device.

2. A switching fabric in accordance with claim 1 wherein at least one of the first and second logic devices comprises a plurality of switch elements arranged in at least first and second stages, the switch elements each having element inputs and outputs, the switch elements being configured to join any element input with any element output.

3. A switching fabric in accordance with claim 1 wherein the first logic device comprises stage-1 switch elements embedded therein and is configured to operate as part of a first stage, the first logic device further comprises stage-2 switch elements embedded therein, the stage-2 switch elements configured to operate as part of a second stage; and
a second logic device containing stage-1 switch elements embedded therein, and configured to operate as part of, the first stage, the second logic device containing stage-2 switch elements embedded therein, and configured to operate as part of, the second stage, the first and second logic devices being physically discrete from one another.

4. A switching fabric in accordance with claim 1 wherein the first logic device comprises stage-1 and stage-2 switch elements embedded therein, the stage-2 switch elements being partitioned into smaller sub-switch elements to enable the switching fabric to operate as the first size fabric and the second size fabric.

5. The switching fabric of claim 1 wherein at least one of the first and second logic devices store multiple routing patterns, the selector device configured to select one of the multiple routing patterns.

6. The switching fabric of claim 1 wherein the selector device is located externally to the first and second logic devices.

7. A switching fabric comprising:
a first and a second logic device, each of the first and second logic devices including a plurality of switch elements, the first and second logic devices being physically separate from one another;
a selector that enables signals to be transmitted from the second logic device to a respective output of the first logic device,
a first routing pattern between the switch elements, and
a second routing pattern between the switch elements, the second routing pattern being different than the first, the first logic device being initially configured based on the first routing pattern, the first logic device being reconfigured based on the second routing pattern to expand or contract a size of the switching fabric such that a quantity of paths from each switch element input to each switch element output is identical for each fabric size.

8. A switching fabric in accordance with claim 7 wherein at least one of the first and second logic devices comprises a plurality of switch elements arranged in at least first and second stages, the switch elements each having element inputs and outputs, the switch elements being configured to join any element input with any element output.

9. A switching fabric in accordance with claim 7 wherein the first logic device comprises stage-1 switch elements embedded therein and is configured to operate as part of a first stage, the first logic device further comprises stage-2 switch elements embedded therein, the stage-2 switch elements configured to operate as part of a second stage, the first and second logic devices being physically discrete from one another.

10. A switching fabric in accordance with claim 7 wherein the first logic device comprises stage-1 and stage-2 switch elements embedded therein, the stage-2 switch elements being partitioned into smaller sub-switch elements to enable the switching fabric to operate as the first size fabric and the second size fabric.

11. The switching fabric of claim 7 wherein at least one of the first and second logic devices store multiple routing patterns, the selector device configured to select one of the multiple routing patterns.

12. A method for constructing a switching fabric, comprising:
partitioning a switching fabric into at least a first and a second logic device such that the first logic device includes at least two switch elements;
partitioning at least one of the two switch elements into smaller sub-switch elements when the switch is operated as a first size switching fabric and not partitioning the two switching elements into smaller sub-switch elements when the switch fabric is operated as a second size switching fabric, wherein a quantity of paths through the switching fabric from each transmission input to each transmission output remains constant for each switch fabric size; and
operating a selector to transmit signals from the second logic device to a respective output of the first logic device.

13. The method of claim 12 further comprising interconnecting the first and second logic devices based on a routing pattern to form the switching fabric.

14. The method of claim 12 further comprising interconnecting the first and second logic devices by multiplexing a plurality of inter-stage connections between switch elements in adjacent stages.

15. The method of claim 12 further comprising adjusting a size of the switching fabric by changing at least one of a number of the logic devices interconnected and the routing pattern between the logic devices.

16. The method of claim 12 further comprising logically repartitioning at least one of the two switch elements from a first sub-switch element matrix size to a larger second sub-switch element matrix size.

17. A logic device configured to be used in a switching fabric, the logic device comprising:
a plurality of inputs each configured to receive a signal at the logic device;
a plurality of outputs each configured to transmit a signal from the logic device;
at least two switch elements, wherein at least one of the switch elements is partitioned into smaller sub-switch elements when the switching fabric is operated as a first size fabric, and the other switch element is not partitioned into smaller sub-switch elements when the multi-stage switching fabric is operated as a second size fabric, wherein a quantity of paths through the switching fabric from each input to each output remains constant for each switch fabric size; and
at least one selector that is configured to receive at least one of a signal that is generated internally by the logic device or a signal that is generated externally from the logic device, and transmit the internal or external signal to a respective output of the logic device.

18. A logic device in accordance with claim 17 wherein the at least one selector is further configured to transmit signals from a second logic device to a respective output of the logic device.

19. A logic device in accordance with claim 17 wherein the logic device comprises stage-1 switch elements embedded therein and is configured to operate as part of a first stage, the logic device further comprises stage-2 switch elements embedded therein, the stage-2 switch elements configured to operate as part of a second stage.

20. The logic device of claim 17 wherein the logic device stores multiple routing patterns to a second logic device, the selector device configured to select one of the multiple routing patterns.

* * * * *